United States Patent Office 2,932,657
Patented Apr. 12, 1960

2,932,657
PURIFICATION OF STEROID PHOSPHATE ESTERS

Burton G. Christensen, Rahway, Ralph F. Hirschmann, Scotch Plains, and Irving Putter, Metuchen, N.J., assignors to Merck & Co., Inc., Rahway, N.J., a corporation of New Jersey No Drawing. Application July 30, 1957
Serial No. 674,999

15 Claims. (Cl. 260—397.45)

This invention relates to water-soluble esters of steroids having cortisone-like anti-inflammatory activity and more particularly to processes for recovering such esters in pure form from reaction mixtures contaminated with inorganic compounds. More specifically, this invention relates to purification of the 21-dihydrogen phosphate esters of steroids and the salts thereof, which are water-soluble compounds and which possess cortisone-like anti-inflammatory activity to a marked degree.

The 21-dihydrogen phosphate esters which are amenable to treatment according to the present invention are compounds having a general formula selected from the group consisting of

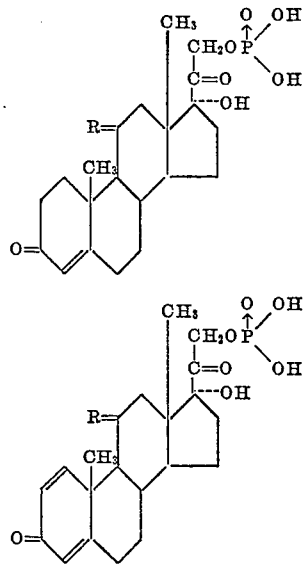

and the therapeutically active nuclear substituted derivatives thereof, where R is either β-hydroxyl

or keto (O=). The compounds treated according to this invention may be either unsubstituted compounds conforming to one of the above formulas, or compounds conforming to one of the above formulas except for the presence of one or more substituents, which either enhances or does not destroy therapeutic activity. Among the substituents which may be present are a double bond, in addition to those shown, as for example at the 6(7) position, and substituent elements and radicals such as 2α-methyl, 6α-methyl, 6β-methyl, 9α-halo (e.g., 9α-fluoro or 9α-chloro), 16α-methyl, and 16α-hydroxy. Compounds which may be purified according to this invention include the 21-dihydrogen phosphates of cortisone, hydrocortisone, 9α-fluorohydrocortisone, 16α-methylcortisone, prednisone, prednisolone, 9α-fluoroprednisolone, 9α-fluoro-16α-hydroxyprednisolone, 6α-methyl- prednisone, 6α-methylprednisolone, 16α-methylprednisolone, $\Delta^{4,6}$ - pregnadiene - 11β,17α,21 - triol - 3,20-dione, $\Delta^{1,4,6}$-pregnatriene-11β,17α,21-triol-3,20-dione, and the like.

The steroid 21-dihydrogen phosphates purified according to this invention, and the alkali metal salts thereof, are outstandingly effective for various purposes because of their water solubility. These compounds are particularly desirable in ophthalmic preparations, as the water solutions of these compounds do not cause irritation to the eye due to the presence of suspended particles. Aqueous solutions of the steroid 21-dihydrogen phosphates and their alkali metal salts are also highly advantageous for intravenous injection, since adverse reactions to intravenous injection of aqueous solutions are much less common than reactions to organic solvents such as alcohol, which is used as a solvent for water-insoluble steroids injected intravenously.

The 21-dihydrogen phosphate esters may be prepared from the corresponding alcohols, such as cortisone, hydrocortisone, prednisolone, and the like. One method for producing 21-dihydrogen phosphate esters of steroids from the corresponding alcohols consists in reacting the alcohol with methane-sulfonyl chloride to produce the corresponding 21-methanesulfonate, reacting this compound with an alkali metal iodide to produce the corresponding 21-iodo compound and reacting the 21-iodo compound with silver dihydrogen phosphate to produce the 21-dihydrogen phosphate ester. This synthesis, using the conversion of prednisolone to 1,4-pregnadiene-11β, 17α-diol-3,20-dione-21-dihydrogen phosphate as an example, may be illustrated by the following equation:

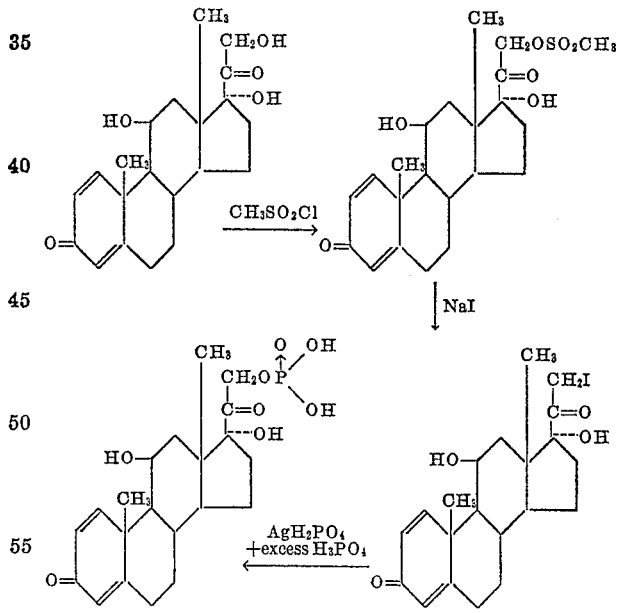

The conversion of the 21-iodo compound, such as 21-iodo - 1,4 - pregnadiene - 11β,17α - diol - 3,20 - dione in the above equation to the corresponding 21-dihydrogen phosphate, is carried out in a suitable organic solvent such as acetonitrile. Upon completion of the reaction, water or an organic solvent such as methanol is added to the reaction mixture to dissolve the steroid 21-dihydrogen phosphate which is produced. Water is preferred as it does not dissolve the non-acidic steroids, i.e. unreacted 21-iodo steroid and side products such as 17α,21-dihydroxy steroids and 17α,21-oxido steroids, which may be present in the reaction mixtures. Whether water or an organic solvent is used to dissolve the steroid 21-dihydrogen phosphate, inorganic material, particularly phosphoric acid, is present in the solution. Removal of the inorganic materials is essential in order to obtain the steroid 21-dihydrogen phosphate in pure form acceptable for pharmaceutical use.

The recovery of steroid 21-dihydrogen phosphates from aqueous solutions contaminated with inorganic material has been very difficult prior to this invention. Numerous precipitants, including alkaline earth metal, polyvalent heavy metal, and amine bases and salts, cannot be used as they coprecipitate a steroid phosphate salt and inorganic material. Selective extraction of the steroid phosphate into a suitable organic solvent such as methanol is costly because the water must first be evaporated, generally by freeze-drying.

An object of this invention is to provide a simple economical process for separating a steroid 21-dihydrogen phosphate ester in pure form directly from a solution of the same which is contaminated with inorganic material, without prior evaporation or removal of the solvent.

A further object of this invention is to remove inorganic material and particularly inorganic phosphate from a solution of a steroid 21-dihydrogen phosphate containing inorganic phosphate.

According to the present invention steroid 21-dihydrogen phosphate esters are recovered in pure form from solutions of the same, which are contaminated with inorganic phosphate. The contaminated solution is contacted with a substance, such as an anion exchange resin, which forms an insoluble substance by reaction selectively with the inorganic phosphate, thereby removing the inorganic phosphate while leaving the steroid 21-dihydrogen phosphate in solution.

Some variations in the process are desirable, depending on whether the purification is carried out in aqueous or organic solvent medium. These will be evident in the detailed description which follows.

In a preferred embodiment of this invention, water is added to a reaction mixture containing a steroid 21-dihydrogen phosphate such as prednisolone-21-dihydrogen phosphate, plus other materials such as phosphoric acid, silver iodide, silver phosphate, and non-acidic steroids such as prednisolone and $17\alpha,21$-oxido-$\Delta^{1,4}$-pregnadiene-$11\beta$-ol-3,20-dione, in an organic reaction medium (preferably acetonitrile), thereby forming an aqueous solution containing the steroid 21-dihydrogen phosphate mixed with phosphoric acid, with the water-insoluble materials, e.g., the non-acidic steroids, silver iodide and silver phosphate, suspended therein. It is desirable to remove the organic reaction medium by evaporaiton. The pH is then adjusted approximately to neutrality, and the water-insoluble materials, e.g., silver iodide and silver phosphate, are removed by filtration. The pH is then adjusted to about 4.8 to 4.9, which is the optimum pH for removal of inorganic phosphate by reaction with an anion exchange resin. A common mineral acid such as hydrochloric acid is used, and any precipitate which forms is filtered off. The solution is then contacted with an anion exchange resin, or alternatively, with a silver salt. This removes the inorganic phosphate, i.e., phosphoric acid and sodium dihydrogen phosphate, while leaving the steroid 21-dihydrogen phosphate in solution.

The steroid phosphate solution, after removal of the inorganic phosphate, is treated with a zinc salt or suitable amine salt to precipitate the corresponding zinc or amine salt of the steroid phosphate. This separates the steroid from any inorganic material remaining in the solution. The zinc or amine steroid phosphate can then be acidified, preferably with a cation exchange resin, to obtain the pure steroid 21-dihydrogen phosphate. The purification of 21-dihydrogen phosphate esters according to the present invention may be illustrated by the following equations showing the purification of prednisolone-21-dihydrogen phosphate:

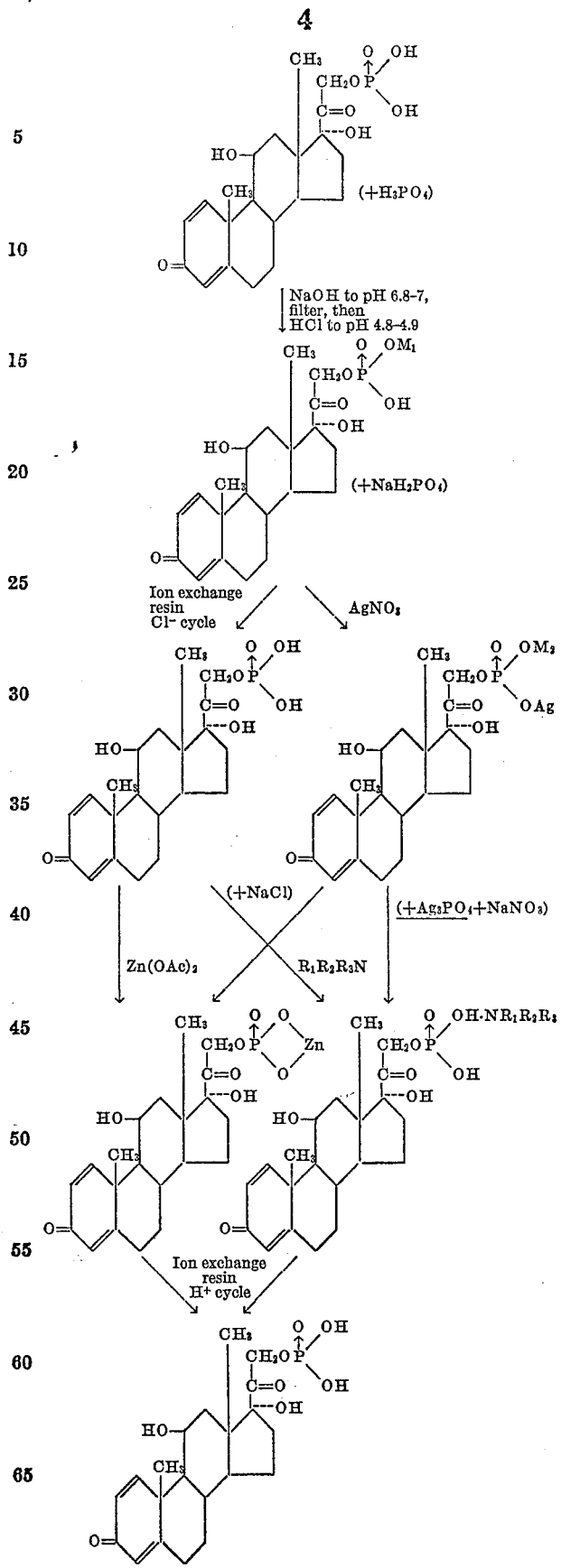

In the above equation $M_1$ represents a mixture of sodium and hydrogen, the former predominating, and $M_2$ represents a mixture of silver and hydrogen, the latter predominating.

Weakly basic anion exchange resins, such as "Amberlite IR–45," "Dowex 3," and "Duolite A–2," are examples of materials suitable for removing inorganic phosphate ions from solution. Such resins effect a virtually quantitative removal of inorganic phosphate from solution and do not adsorb the steroid phosphate ester. Strongly basic anion exchange resins, while usable, are less desirable than the weakly basic anion exchange resins, as they also adsorb a portion of the steroid phosphate ester while removing inorganic phosphate ions.

The ion exchange resin may be either on a salt cycle, such as a chloride, acetate, sulfate, or nitrate cycle, or on the hydroxide cycle. The cycle is such that the exchangeable ion of the resin will not cause coprecipitation of non-steroidal material with the steroid phosphate when the latter is precipitated as will hereinafter be described. Chloride and acetate have been found to give the best results.

The pH of the solution treated may be varied widely. Excellent results are obtained when the pH is in the range of about 4 to 8, using an anion exchange resin on a salt cycle such as chloride or acetate. On the other hand, effective separation of steroid phosphate from inorganic phosphate is also obtained by contacting a solution having a low initial pH, for example, about 1 or 2, with an anion exchange resin on the hydroxide cycle. In a preferred mode of operation, the pH of the solution treated is about 4.8 to 4.9, and the resin is on a salt cycle.

Contact between the solution and the resin may be made in any conventional manner, such as passing the solution through a bed or column of resin, or slurrying the resin in the solution.

Alternatively, the inorganic phosphate ions may be removed from solution by precipitation. Very few reagents possess the essential requirement of the precipitant: to react selectively with the inorganic phosphate ions and thereby precipitate them while leaving the steroid dihydrogen phosphate ester in solution. The alkaline earth metal salts and the salts of polyvalent heavy metals such as iron, manganese, and zinc, for example, coprecipitate both the steroid dihydrogen phosphates and the inorganic phosphates as the corresponding alkaline earth metal or heavy metal salts.

Silver nitrate and other water-soluble silver salts have the surprising property of leaving the steroid 21-dihydrogen phosphate in solution, while precipitating inorganic phosphate ions as trisilver phosphate. Addition of silver nitrate to a solution of a steroid 21-dihydrogen phosphate ester containing inorganic phosphate causes the inorganic phosphate to precipitate as trisilver phosphate, leaving a solution of steroid 21-dihydrogen phosphate containing nitrate ions, from which the steroidal material is readily separated in the second step of the process.

After removal of the inorganic phosphate from solution, the next step in the process is to recover the steroid 21-dihydrogen phosphate from solution as a water-insoluble salt. An important requisite of the precipitant is that it must precipitate the steroid substantially quantitatively. In a preferred embodiment of the invention the precipitate is a salt which is readily converted to the water-soluble steroid 21-dihydrogen phosphate in pure form.

Water-soluble zinc salts such as zinc chloride and zinc acetate have been found to be excellent precipitants. An excess of zinc salt is used to insure complete precipitation of the steroid. Other zinc salts are also suitable precipitants. The zinc compound reacts with a steroid 21-dihydrogen phosphate such as prednisolone 21-dihydrogen phosphate, prednisone 21-dihydrogen phosphate, hydrocortisone 21-dihydrogen phosphate, or cortisone 21-dihydrogen phosphate, to form the corresponding zinc salt. A typical reaction of this sort is illustrated in the foregoing equation, which shows the conversion of prednisolone 21-dihydrogen phosphate to a corresponding zinc salt. The formula for the zinc prednisolone phosphate, which is indicated

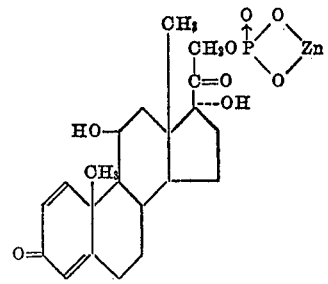

is probably the formula for the precipitate or a major proportion of it. It will be noted that both ionizable hydrogen atoms have been replaced by zinc. However, it is possible that the formula of part or all of the zinc prednisolone phosphate is more accurately represented by another formula such as the following formula for an acid salt:

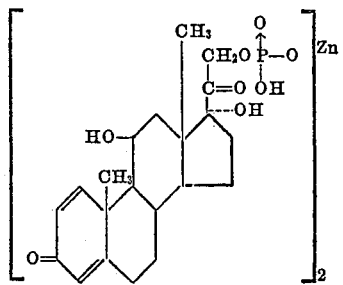

Thus, the terms, "zinc prednisolone phosphate" and "a zinc salt of prednisolone 21-dihydrogen phosphate" represent any zinc salt of prednisolone 21-dihydrogen phosphate. The same also holds true for the zinc salts of other steroid 21-dihydrogen phosphates.

The zinc steroid phosphates are readily converted to pure steroid 21-dihydrogen phosphates, as will be hereinafter described. They are also highly effective anti-inflammatory agents which are suitable for incorporation into ointments for topical application. A further use is as anti-inflammatory agents for oral administration.

The water-soluble steroid 21-dihydrogen phosphates may be precipitated as insoluble amine salts rather than as insoluble metal salts, if desired. A typical reaction, the precipitation of prednisolone 21-dihydrogen phosphate, is shown in the equation above. A large number of amines and their acid addition salts are suitable precipitants. When the ultimate product desired is a pure steroid 21-dihydrogen phosphate, the amine chosen is one whose corresponding steroid 21-phosphate is insoluble but readily converted to the pure steroid 21-dihydrogen phosphate. Suitable amines for this purpose include 4,4'-diaminodiphenylsulfone, 5-nitroimidazole, 1-(3-aminophenyl)-3-methyl-5-pyrazolone, 2-amino-5-azotoluene, 1-nitro-2-naphthylamine, N-benzyl-β-phenylethylamine, and brucine.

The insoluble amine salts of steroid 21-dihydrogen phosphates are useful as anti-inflammatory agents, particularly in ointments for topical use. Salts formed by the reaction of a steroid 21-dihydrogen phosphate such as prednisolone 21-dihydrogen phosphate, prednisone 21-dihydrogen phosphate, cortisone 21-dihydrogen phosphate, hydrocortisone 21-dihydrogen phosphate, 9α-fluorohydrocortisone 21-dihydrogen phosphate, and the like with amines such as methylamine, ethylamine, n-butylamine, 2-ethylhexylamine, diethylamine, dibutylamine, dimethylamine, triethylamine, hydroxylamine, triethanolamine, DL-α-phenylethylamine, aniline, 2,6-lutidine, α-naphthylamine, β-naphthylamine, pyridine, 7-methylquinoline, acetoguanidine, 2-amino-5-azotoluene, 1-nitro-2-naphthylamine, 2-aminoanthraquinone, 4-aminoantipyrene, 2-amino-5-azoanisole, pyrrole, 5-nitroimidazole, aminoguanidine, 2-(2-aminoethylamino)-ethanol, aminoethylethanolamine, 2-amino-5-nitrophenol, 2-amino-5-nitrothiazole, 1-(3-aminophenyl)-3-methyl-5-pyrazolone, 2- aminopyrimidine, 4,5-diaminouracil, 4,4'-diaminodiphenylsulfone, betaine, β-alanine, 2-amino-3-carboxylpyridine, phenylhydrazine, 2,4-dinitrophenylhydrazine, and Girard's "T" reagent, or their acid addition salts such as the hydrochlorides, possess anti-inflammatory activity. A particularly valuable anti-inflammatory amine salt is the trimethylamine salt of prednisolone 21-dihydrogen phosphate.

Pure steroid 21-dihydrogen phosphate esters may be recovered from the insoluble salt by acidification. A preferred means of acidification is the use of a strongly acidic cation-exchange resin in its hydrogen cycle. Various sulfonic acid resins are among the suitable cation-exchange resins. The steroid 21-phosphate salt in a suitable solvent such as methanol is contacted with the ion-exchange resin. The resulting product is a solution of steroid 21-dihydrogen phosphate. This step is shown in the above equation by way of example as the conversion of prednisolone 21-dihydrogen phosphate zinc salt to prednisolone 21-dihydrogen phosphate.

The steroid dihydrogen phosphate may either be recovered in pure form by conventional means such as evaporation of the solvent or may be converted to an alkali metal salt. Either a monoalkali metal salt or a dialkali metal salt may be formed. The conversion to the alkali metal salt is carried out in an anhydrous organic solvent to facilitate the recovery of the pure salt. Suitable solvents include the lower aliphatic alcohols, especially methanol. The alkali metal alkoxides such as sodium methoxide are preferred neutralizing agents, although alkali metal hydroxides may be used. By way of example, monosodium prednisolone 21-hydrogen phosphate is made by neutralizing prednisolone 21-dihydrogen phosphate to a pH of 5.2 to 5.5 with sodium methoxide in methanol solution. The disodium salt is made by neutralizing to a higher pH, about 9.2 to 9.6. Other steroid phosphate alkali metal salts are made in the same manner from the corresponding steroid 21-dihydrogen phosphates. The alkali metal salt may be recovered from the reaction medium by suitable means such as precipitation with ether. An anhydrous organic solvent medium is used instead of an aqueous medium to facilitate recovery of the alkali metal steroid phosphate.

Reaction products may be purified in an organic solvent according to the present invention to obtain pure steroid 21-dihydrogen phosphates. Methanol and the other lower aliphatic alcohols are among the suitable solvents for this purpose. It is possible to use a somewhat simpler purification procedure in an alcoholic solvent than in water. A preferred procedure, described with reference to the purification of prednisolone 21-dihydrogen phosphate but equally applicable to the purification of other steroid 21-dihydrogen phosphates, is as follows:

A reaction product containing prednisolone 21-dihydrogen phosphate and impurities in acetonitrile or other organic reaction medium is diluted with methanol. This dissolves all steroids present, e.g., prednisolone, 21-iodo-$\Delta^{1,4}$-pregnadiene-11β,17α-diol - 3,20 - dione, and 17α,21-oxido-$\Delta^{1,4}$-pregnadiene-11β-ol-3,20-dione, as well as prednisolone 21-dihydrogen phosphate, and the silver salt thereof, and phosphoric acid. Silver iodide and silver phosphate are insoluble and may be removed by filtration. The solution is treated wtih a cation exchange resin, such as "Amberlite IR-120," in its hydrogen form. This removes all silver present, converting the silver salt of prednisolone 21-dihydrogen phosphate to the free acid ester. The effluent is treated with an anion exchange resin, such as "Amberlite IR-45" in its hydroxyl form, to remove inorganic phosphate, which is present chiefly as phosphoric acid. The acetonitrile is then distilled off. This may be done earlier in the process if desired.

Purification in an alcohol is simpler than in water because it is possible to form the sodium salt directly after the inorganic phosphate has been removed, without first forming the zinc or an amine salt. Either the mono- or disodium salt may be formed by reaction of prednisolone 21-dihydrogen phosphate with sodium methoxide in methanol as previously described.

The equation for the purification of prednisolone 21-dihydrogen phosphate in methanol is as follows:

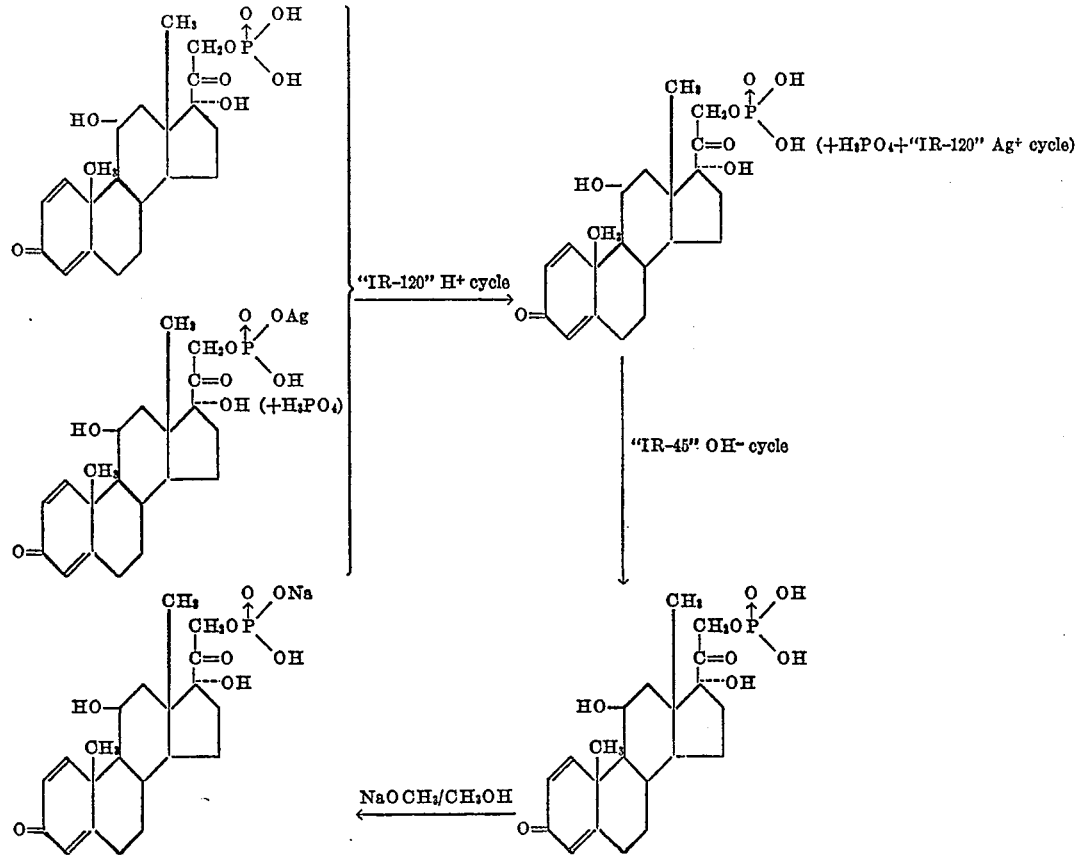

A typical procedure for preparing steroid 21-dihydrogen phosphate esters from the corresponding alcohols is illustrated in detail below with reference to the conversion of prednisolone to prednisolone 21-dihydrogen phosphate.

PREPARATION OF PREDNISOLONE 21-METHANESULFONATE

Seventy liters of dry pyridine and 7.5 kg. of prednisolone are charged to a 30-gallon jacketed glass-lined still. The mixture is agitated until complete solution is obtained. About 40 liters of pyridine are distilled at high vacuum while maintaining the batch temperature below 40° C. The solution is cooled to 0° C., and 2.2 liters of methanesulfonyl chloride are charged. The batch temperature is maintained between 0° and +3° C. during charging of the methanesulfonyl chloride. An atmosphere of flowing nitrogen is maintained in the still, and the mixture is agitated during the last stages of the addition. The mixture is then aged for one hour, and 15 gallons of ice water are added cautiously to the still while maintaining the temperature between 0° and 5° C. The still contents are then transferred to a jacketed kettle equipped with an agitator, and 62 kg. of cracked ice in 15 gallons of deionized water are added. The batch is aged one hour and a solution of 2 liters of concentrated (37%) hydrochloric acid in 4 gallons of deionized water is added. The batch is centrifuged and the centrifuge cake washed free of pyridine with deionized water. The centrifuge cake is then vacuum-dried at 50° C. to a moisture content of about 1%, which requires about three days of drying. Yield about 7.77 kg. (92%).

PREDNISOLONE 21-IODIDE

To a 30-gallon jacketed glass-lined still 64.5 lbs. (31.0 liters) of dimethylformamide are charged by vacuum. The still contents are agitated as 7.74 kg. of dry (less than 1% moisture) prednisolone 21-methanesulfonate are charged. Then 4.02 kg. of sodium iodide are charged. The still contents are heated to 57° to 60° C. by means of a steam jacket and held at this temperature for 30 minutes. The batch is cooled to 35° C. and 12 gallons of deionized water are added at the rate of about one gallon per minute. In the event the solution becomes cloudy, addition of water is interrupted and the mixture agitated for five minutes before resumption of water addition. After all of the water is added, the batch is transferred to a 50-gallon kettle equipped with agitator and an additional 16.7 gallons of deionized water are added. The batch is cooled to 0° to 5° C. and aged for one hour. The batch is filtered and the filter cake washed and vacuum-dried at 30° to 35° C. to a moisture content of less than 1%. Yield about 7.95 kg. (96%).

PREPARATION OF SILVER DIHYDROGEN PHOSPHATE

To a 100-gallon jacketed glass-lined still, 216 liters of deionized water and 38.6 kg. of monobasic sodium phosphate are charged. The charge is heated at 60° to 70° C. until complete solution is obtained. A solution of 18.0 kg. of silver nitrate in 90 liters of water is added. The batch is aged for one hour at 60° to 70° C., cooled to 30° C. and filtered. The filter cake is washed five times with 5 gallons of deionized water, and air-dried on stainless steel trays at 60° C., to a moisture content of 0.5%. The approximate yield of trisilver phosphate is 12.5 kg. (85%).

To a 5-gallon stainless steel mixing bowl of a Hobart blender, 4.87 liters of 85% phosphoric acid and 11.75 kg. of trisilver phosphate are added with gentle agitation. The mixing bowl is cooled with cracked ice during the addition. The agitator speed is increased, and the slurry is agitated for 15 minutes. Then 300 ml. of acetonitrile are added and the mixture agitated for five additional minutes. The slurry is then passed twice through a colloid mill and 4.7 liters of acetonitrile are added to the slurry prior to the second pass. This results in finely divided silver dihydrogen phosphate.

PREPARATION OF PREDNISOLONE DIHYDROGEN PHOSPHATE

The slurry of silver dihydrogen phosphate prepared as described above and an additional 64.7 liters of acetonitrile are charged to a 50-gallon, jacketed, stainless steel still equipped with 120-r.p.m. turbine impeller. The charge is agitated and an atmosphere of flowing nitrogen is maintained in the still. Then 7 kg. of prednisolone 21-iodide and 1.5 kg. of a diatomaceous earth filter aid are charged to the still, and the contents are heated to gentle reflux (about 84° C.) for three and one-fourth hours. The vapor riser of the still is water-cooled during reflux. The batch is cooled to 30° C. and 30 kg. of cracked ice and 20 liters of water are added. The batch is transferred to a 100-gallon jacketed kettle equipped with an agitator. The still is rinsed with three 5-liter portions of water which are added to the kettle. The pH is adjusted to a value in the range of 6 to 6.5 by the addition of sodium hydroxide solution, while maintaining the batch temperature below 20° C. The batch is then transferred to a 50-gallon stainless steel still and the kettle washed with two 2-liter portions of water which are added to the batch. The acetonitrile is vacuum-evaporated at 30 mm. of mercury and a batch temperature below 30° C. Water at 60° C. is circulated through the jacket of the still to maintain the batch temperature. The end point of the concentration is indicated by a rise in internal temperature, slowing of the distillation rate, and an increase in foaming. When the concentration is completed, any silver compound on the side of the still is scraped down and the pH of the batch adjusted to within the range of 6.8 to 7 by adding about 4 liters of 34% sodium hydroxide solution while the temperature is maintained below 20° C. The batch is stirred for two hours and readjusted to pH 6.8 to 7. The batch is filtered on a 32-inch ceramic pot connected to a vacuum trap. The filter cake, which is essentially silver iodide, is sucked dry, washed with 10 liters of deionized water, transferred to a kettle, and slurried with 30 liters of deionized water. The slurry is refiltered and the filter cake washed with 30 liters of water three additional times, and the filter cake is collected after the last filtration. The filtrates are combined in a 100-gallon glass-lined kettle.

The solution of prednisolone-21-dihydrogen phosphate, prepared as above described, is contaminated with inorganic phosphate. This solution is then treated according to the present invention to recover prednisolone-21-dihydrogen phosphate or salt thereof in pure form as illustrated by the following examples:

*Example 1*

REMOVAL OF INORGANIC PHOSPHATE WITH ION EXCHANGE RESIN

To the combined filtrates of prednisolone-21-dihydrogen phosphate containing inorganic phosphate, prepared as described above, enough concentrated hydrochloric acid is added to adjust the pH to 4.8 to 4.9. This requires about 3.5 liters. The batch is filtered, and the filter cake washed with two 2-liter portions of water which are added to the filtrate. One-half of the filtrate is charged to a column containing 33 gallons of "Amberlite IR–45" ion-exchange resin on the chloride cycle. The discharge rate from the column is adjusted to 3 liters per minute. Approximately the first 20 liters of the effluent are discarded. The effluent is then spot-checked with an ultra-violet scanner until a positive ultra-violet test is obtained. At this point the effluent flow is collected in a 150-gallon kettle and 30 gallons are collected therein. Then the next 5 gallons are collected in a carboy and 10 additional gallons in a second carboy. The contents of these two carboys are added to the kettle, provided they contain at least 1 mg./ml. of steroid as shown by ultra-violet absorption. The other half of the filtrate is charged to a second column of "IR-45" and collected in the same manner as the first half. The effluent is prednisolone dihydrogen phosphate free of inorganic phosphate ions.

*Example 2*

PREPARATION OF ZINC PREDNISOLONE PHOSPHATE

A sample of effluent from Example 1 is assayed by ultra-violet to determine steroid content. The effluent is adjusted to pH 5 to 5.2 with about 50 ml. of concentrated hydrochloric acid. A solution of about 3 kg. of zinc acetate in 8 liters of water is prepared and heated to 70° to 75° C. The exact amount of zinc acetate is two equivalents per equivalent of prednisolone dihydrogen sulfate, which corresponds to about equal weights of both materials. The zinc acetate solution is added to the effluent with agitation over a 10-minute period, which results in immediate precipitation of zinc prednisolone phosphate. This addition is carried out in a steam jacketed vessel. When the addition is complete the vessel is heated through the steam jacket to internal temperature of 60° C. and maintained at this temperature for one hour with the agitator off to increase the particle size of the product. The batch is centrifuged, the mother liquors discarded, and the cake washed until chloride-free. The cake is spun dry and then dried in a vacuum drier at 60° C. to a moisture content of less than 10%. This requires over three days. Yield about 3.2 kg. (dry basis).

*Example 3*

REGENERATION OF PREDNISOLONE DIHYDROGEN PHOSPHATE

To a 100-gallon still 66.7 liters (116 lbs.) of dry methanol are charged, then 36 liters of ion exchange resin "Amberlite IR-120" on the hydrogen cycle and 3.2 kg. of zinc prednisolone phosphate are charged to the still. The batch is agitated for two hours at 20° to 30° C. Then 400 g. of decolorizing charcoal are added to the batch which is stirred for 30 minutes. The batch is filtered and the filtrate washed with methanol until the cake is substantially free of steroid as shown by an ultra-violet scanner. The filtrate is then recharged to the still. The filtrate is prednisolone dihydrogen phosphate in solution.

*Example 4*

PREPARATION OF MONOSODIUM PREDNISOLONE HYDROGEN PHOSPHATE

Fifty liters of methanol are charged to a 20-gallon still. One pound of freshly-opened sodium methoxide is added and the contents agitated under a nitrogen atmosphere until solution is complete. The filtrate from Example 3 is titrated with this sodium methoxide solution to a pH of 5.2 to 5.5, which requires about 30 to 40 liters of sodium methoxide solution. The batch is concentrated to less than 15 liters under vacuum of 29 inches of mercury and batch temperature below 30° C. The concentration is carried out in a 100-gallon still having a jacket surrounding the still pot. Atmospheric steam is circulated through this jacket until the volume of the batch is about 15 gallons; then water at 60° C. is circulated through the jacket. After concentration 360 lbs. of anhydrous ether are added to the batch which is aged for one hour at 15° to 25° C. in a flowing nitrogen atmosphere. The slurry is filtered, and air is excluded during filtration. The still and the filter cake are washed with two 6-liter portions of ether which are added to the filtrate. The filter cake is vacuum dried on stainless steel trays at 25° to 30° C. Approximate yield 2.55 kg. (about 35% on dry basis).

While the procedure illustrated in Examples 1 through 4 represents a preferred mode of practicing the present invention, other modes are permissible, as is evident from the foregoing specification. Various alternative modes of operation, such as removal of inorganic phosphate with a silver salt instead of an ion exchange resin, and precipitation of the prednisolone 21-dihydrogen phosphate as an amine salt rather than a zinc salt, will be illustrated in the examples which follow.

*Example 5*

PRECIPITATION OF INORGANIC PHOSPHATE WITH SILVER NITRATE

To an aqueous solution having a volume of 240 ml. and containing 9.68 mg./ml. of prednisolone 21-dihydrogen phosphate was added 20.72 g. (10% excess) of silver nitrate dissolved in 20 ml. of water with stirring. A precipitate was formed. The suspension was allowed to stand for one hour, and the precipitate was then filtered and washed. The pH of the filtrate was adjusted to 6.8 with dilute aqueous sodium hydroxide. More silver phosphate precipitated and was filtered off. The filtrate was collected for further treatment to recover pure prednisolone 21-dihydrogen phosphate.

*Example 6*

PREPARATION OF 4,4'-DIAMINODIPHENYLSULFONE SALT OF PREDNISOLONE 21-DIHYDROGEN PHOSPHATE AND CONVERSION OF SAME TO MONOSODIUM SALT

A reagent solution of 4,4'-diaminodiphenylsulfone hydrochloride was prepared by dissolving 5.00 g. of 4,4'-diaminodiphenylsulfone in the minimum quantity of 2.5 N hydrochloric acid to effect solution and diluting to 100 ml. with water.

To a solution containing 2.00 g. of impure prednisolone-21-dihydrogen phosphate containing 11% by weight of $PO_4\equiv$ in 100 ml. of water, 5 g. of diatomaceous earth filter aid ("Supercel") was added. The entire mixture was stirred vigorously with a mechanical stirrer. To this solution 20 ml. of the solution of 4,4'-diaminodiphenylsulfone hydrochloride was added drop-wise with stirring. The mixture was stirred vigorously for one-half hour after the addition of 4,4'-diaminodiphenylsulfone was complete. The resulting suspension was filtered and washed thoroughly with water. The filter cake consisted primarily of the filter aid and the 4,4'-diaminodiphenylsulfone salt of prednisolone 21-dihydrogen phosphate.

The filter cake was extracted successively with a 50-ml. portion and two 25-ml. portions of methanol. The methanol extracts were combined, stirred for one hour with 5.00 g. of "IR-120" ion-exchange resin on the acid cycle with a mechanical stirrer. The resin was filtered from the solution and washed twice with 10-ml. portions of methanol. These portions were added to the filtrate, which was evaporated to dryness in vacuo on a hot water bath. The residue was dissolved in 10 ml. of methanol, and 2.2 ml. of a solution of a ca. 5% solution of sodium methoxide in methanol was added to the solution of prednisolone dihydrogen phosphate. The pH was adjusted to 5.7, and 60 ml. of diethyl ether was added to precipitate monosodium prednisolone hydrogen phosphate. The precipitate was filtered and dried overnight in a vacuum dessicator to constant weight. Yield 0.640 g.

*Example 7*

Two milliliters of a one percent aqueous solution of prednisolone 21-dihydrogen phosphate was introduced into each of 40 test tubes. Each of the 40 amines listed below was then added to a separate test tube. Two drops of each liquid amine and 0.050 g. of each solid amine were added. In the case of the amines introduced as the free amine, two drops of 2.5 N hydrochloric acid were added so that the final pH of the solution was about 7. No acid was added where the amine was supplied as an acid addition salt.

The amine reagents were as follows:

(1) Triethylamine
(2) Phenylhydrazine
(3) Carbomethoxylamine hydrochloride
(4) 2,6-lutidine
(5) Pyridine
(6) Girard's "T" reagent
(7) Methoxylamine hydrochloride
(8) n-Butylamine
(9) Hydroxylamine hydrochloride
(10) Aniline
(11) dl-α-Phenylethylamine
(12) Acetoguanamine
(13) β-Alanine
(14) α-Naphthylamine
(15) 2-ethylhexylamine
(16) 2,4-dinitrophenylhydrazine
(17) Dioctylamine
(18) 2-aminoanthraquinone
(19) 4-aminoantipyrene hydrochloride
(20) 2-amino-5-azoanisole
(21) 2-amino-5-azotoluene
(22) 1-nitro-2-naphthylamine
(23) 7-methylquinoline
(24) 2-amino-3-carboxylpyridine
(25) 2-(2-aminoethylamino)-ethanol
(26) Aminoethylethanolamine
(27) Pyrrole
(28) Aminoguanidine sulfate
(29) 5-nitroimidazole
(30) Diethylaniline
(31) 2-amino-5-nitrophenol
(32) 2-amino-5-nitrothiazole
(33) 1-(m-aminophenyl)-3-methyl-5-pyrazole
(34) 2-aminopyrimidine
(35) β-Naphthylamine
(36) 4,5-diaminouracil sulfate
(37) Dibutylamine
(38) 4,4'-diaminodiphenylsulfone
(39) Triethanolamine titanate
(40) Betaine hydrochloride A precipitate of the amine salt of prednisolone phosphate was formed in each test tube. Only slight amounts of precipitate were formed in the tubes containing 2-amino-pyridine and 3-aminoquinoline.

The purification may be carried out in alcoholic medium as illustrated by the following example:

*Example 8*

Prednisolone 21-dihydrogen phosphate was prepared by combining 8.0 g. of 21-iodo-Δ$^{1,4}$-pregnadiene-11β,17α-diol-3,20-dione with 12.8 g. of trisilver phosphate and 4 ml. of 100% phosphoric acid in 80 ml. of acetonitrile, refluxing for three hours, 10 minutes, and cooling to room temperature. The insoluble material was filtered off and washed with methanol, which was added to the acetonitrile solution. The solution was slurried with 75 ml. of "Amberlite IR-120" resin on the hydrogen cycle, stirred for 1½ hours at room temperature, and the resin removed. The resin was washed with a small volume of methanol. The total volume of solution at this point was 740 ml. Assay of this solution showed 7.5 mg./ml. of inorganic phosphate (as $PO_4^{\equiv}$). One-half of this solution was passed over a column of 250 cc. of "Amberlite IR-45" resin on the hydroxyl cycle at a rate equivalent to a contact time of 25 minutes. The column was washed with about 100 ml. of methanol to yield an inorganic phosphate-free solution of prednisolone 21-dihydrogen phosphate.

The effluent was concentrated to 168 ml. To this solution 9.4 ml. of a 2% solution of sodium methoxide in methanol was added, raising the pH to 5.2. The solution was concentrated in vacuo to a thick slurry, and 280 ml. of anhydrous ether were added. The solution was stirred for one hour at 5° C., filtered, and washed with ether. Yield 2.0 g. (56%) of monosodium salt of prednisolone 21-dihydrogen phosphate; E% (H$_2$O) 321, λ$_{max}$ 2470; E% (MeOH) 314, λ$_{max}$ 2425. The product contained 0.5% of inorganic phosphate (as $PO_4^{\equiv}$).

The purification according to the present invention has been described with particular reference to water and methanol as solvents. However, it is understood that the purification may be carried out in other solvents such as ethanol, isopropanol, tetrahydrofuran, acetonitrile, ethyl acetate, dimethylformamide, and the like.

While the present invention has been described in detail with reference to various specific embodiments thereof, it is understood that the scope of this invention is to be measured only by the scope of the appended claims.

What is claimed is:

1. A process for purifying an aqueous solution of an unsaturated pregnane series steroid 21-dihydrogen phosphate ester having a general formula of the group consisting of

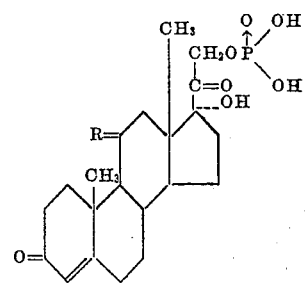

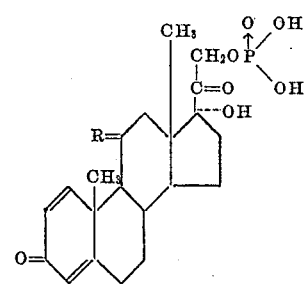

and the therapeutically active nuclear substituted derivatives thereof, where R is selected from the group consisting of

and O=, contaminated with inorganic phosphate ions, which comprises contacting said solution with a substance which forms an insoluble product by reaction selectively with said inorganic phosphate ions, and separating the inorganic phosphate ion-free unsaturated pregnane series steroid 21-dihydrogen phosphate solution from said insoluble product.

2. A process for purifying an aqueous solution of an unsaturated pregnane series steroid 21-dihydrogen phosphate ester having a general formula of the group consisting of

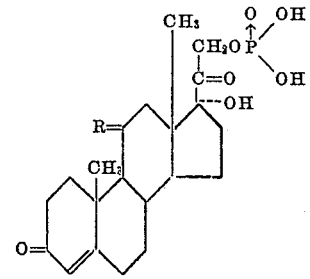

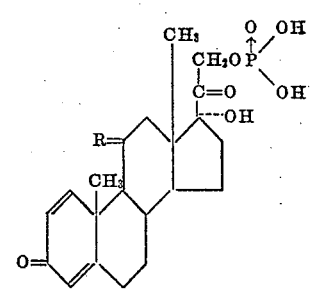

and the therapeutically active nuclear substituted derivatives thereof, where R is selected from the group consisting of

and O=, contaminated with inorganic phosphate ions, which comprises contacting said solution with an anion exchange resin having an anion exchangeable with the inorganic phosphate ions of the solution, and separating an inorganic phosphate ion-free unsaturated pregnane series steroid 21-dihydrogen phosphate solution from the anion exchange resin.

3. A process for purifying an aqueous solution of prednisolone 21-dihydrogen phosphate contaminated with inorganic phosphate ions, which comprises contacting said solution with an anion exchange resin having an anion exchangeable with the inorganic phosphate ions of the solution, and separating an inorganic phosphate ion-free prednisolone 21-hydrogen phosphate solution from the anion exchange resin.

4. A process for purifying an aqueous solution of an unsaturated pregnane series steroid 21-dihydrogen phosphate ester having a general formula of the group consisting of

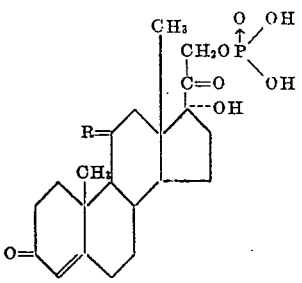

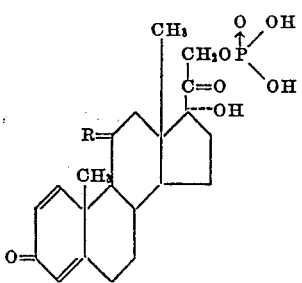

and the therapeutically active nuclear substituted derivatives thereof, where R is selected from a group consisting of

and O=, contaminated with inorganic phosphate ions, which comprises contacting said solution with a water-soluble silver salt, and separating an inorganic phosphate ion-free unsaturated pregnane series steroid 21-dihydrogen phosphate solution from the resulting precipitate of silver phosphate.

5. A process for purifying an aqueous solution of prednisolone-21-dihydrogen phosphate contaminated with inorganic phosphate ions, which comprises contacting said solution with a water-soluble silver salt, and separating an inorganic phosphate ion-free prednisolone-21-dihydrogen phosphate solution from the resulting precipitate of silver phosphate.

6. A process for purifying a solution of an unsaturated pregnane series steroid 21-dihydrogen phosphate ester having a general formula of the group consisting of

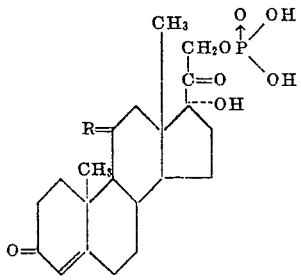

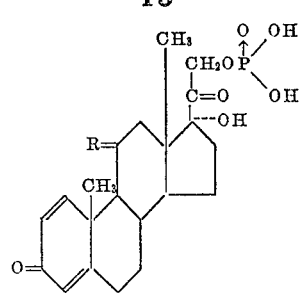

and the therapeutically active nuclear substituted derivatives thereof, where R is selected from the group consisting of

and O=, contaminated with inorganic phosphate, which comprises contacting said solution with a substance which forms an insoluble product by reaction selectively with said inorganic phosphate and separating the inorganic phosphate-free unsaturated pregnane series steroid 21-dihydrogen phosphate solution from said insoluble product.

7. A process for purifying a solution of an unsaturated pregnane series steroid 21-dihydrogen phosphate ester having a general formula of the group consisting of

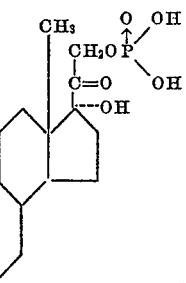

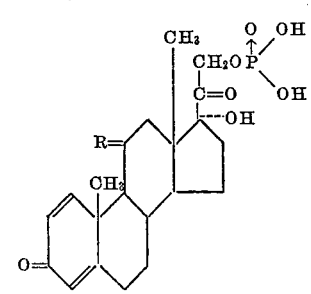

and the therapeutically active nuclear substituted derivatives thereof, where R is selected from the group consisting of

and O=, contaminated with inorganic phosphate, which comprises contacting said solution with an anion exchange resin having an anion exchangeable with the inorganic phosphate in said solution and separating an inorganic phosphate-free unsaturated pregnane series steroid 21-dihydrogen phosphate solution from the anion exchange resin.

8. A process for purifying a solution of prednisolone 21-dihydrogen phosphate, contaminated with inorganic phosphate which comprises contacting said solution with an anion exchange resin having an anion exchangeable with the inorganic phosphate in said solution and separating an inorganic phosphate-free prednisolone 21-dihydrogen phosphate solution from the anion exchange resin.

9. A process for purifying an alcoholic solution of an unsaturated pregnane series steroid 21-dihydrogen phosphate ester having a general formula of the group consisting of

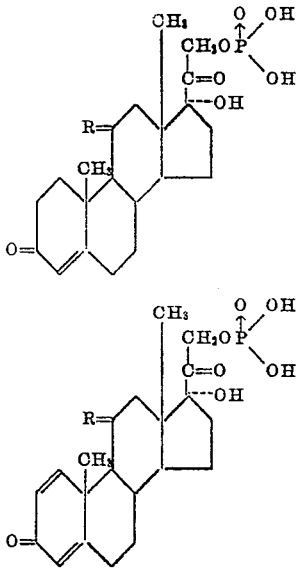

and the therapeutically active nuclear substituted derivatives thereof, where R is selected from the group consisting of

and O=, which comprises contacting said solution successively with a cation exchange resin in its hydrogen form and an anion exchange resin in its hydroxyl form and recovering an inorganic phosphate-free unsaturated pregnane series steroid 21-dihydrogen phosphate solution from the ion exchange resins.

10. The process according to claim 9 wherein the alcoholic solvent is methanol.

11. The process according to claim 9 wherein the steroid 21-dihydrogen phosphate is prednisolone 21-dihydrogen phosphate.

12. A process for purifying an aqueous solution of a 21-phosphate of an unsaturated 11-oxygenated 17α,21-dihydroxy-3,20-diketo steroid of the pregnane series in which the carbon atoms at the 4 and 5 positions are linked by a double bond, and the 11-oxygenated function is selected from the group consisting of β-hydroxyl and keto, contaminated with inorganic phosphate ions, which comprises contacting said solution with a substance which forms an insoluble product by reaction selectively with said inorganic phosphate ions, and separating an inorganic phosphate ion-free steroid phosphate solution from said insoluble product.

13. A process for purifying an aqueous solution of a 21-phosphate of an unsaturated 11-oxygenated 17α,21-dihydroxy-3,20-diketo steroid of the pregnane series in which the carbon atoms at the 4 and 5 positions are linked by a double bond, and the 11-oxygenated function is selected from the group consisting of β-hydroxy and keto, contaminated with inorganic phosphate ions, which comprises contacting said solution with an anion exchange resin having an anion exchangeable with the inorganic phosphate ions of the solution, and separating an inorganic phosphate ion-free steroid phosphate solution from the anion exchange resin.

14. A process for purifying an aqueous solution of a 21-phosphate of an unsaturated 11-oxygenated 17α,21-dihydroxy-3,20-diketo steroid of the pregnane series in which the carbon atoms at the 4 and 5 positions are linked by a double bond, and the 11-oxygenated function is selected from the group consisting of β-hydroxy and keto, contaminated with inorganic phosphate ions, which comprises contacting said solution with a water-soluble silver salt, and separating an inorganic phosphate ion-free steroid phosphate solution from the resulting precipitate of silver phosphate.

15. A process for purifying an aqueous solution of prednisolone 21-dihydrogen phosphate contaminated with inorganic phosphate ions, which comprises contacting said solution with a substance which forms an insoluble product by reaction selectively with said inorganic phosphate ions, and separating an inorganic phosphate ion-free prednisolone 21-dihydrogen phosphate solution from said insoluble product.

References Cited in the file of this patent

UNITED STATES PATENTS 2,779,775    Sarett _____ Jan. 29, 1957